United States Patent
Chang et al.

(10) Patent No.: US 8,253,709 B2
(45) Date of Patent: Aug. 28, 2012

(54) ELECTRONIC DEVICE AND METHOD FOR PREDICTING WORD INPUT

(75) Inventors: Han-Zen Chang, Tu-Cheng (TW);
Shui-Sheng Lin, Tu-Cheng (TW);
Yi-Cheng Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 253 days.

(21) Appl. No.: 12/639,144

(22) Filed: Dec. 16, 2009

(65) Prior Publication Data

US 2010/0277424 A1    Nov. 4, 2010

(30) Foreign Application Priority Data

Apr. 29, 2009   (CN) .......................... 2009 1 0301969

(51) Int. Cl.
*G06F 3/041* (2006.01)
(52) U.S. Cl. ...................................................... 345/173
(58) Field of Classification Search .................. 345/173, 345/168; 708/142; 715/261
See application file for complete search history.

(56) References Cited

U.S. PATENT DOCUMENTS

| | | | | |
|---|---|---|---|---|
| 5,748,512 A * | 5/1998 | Vargas | ........................... | 708/142 |
| 6,002,390 A * | 12/1999 | Masui | ........................... | 345/173 |
| 7,030,863 B2 * | 4/2006 | Longe et al. | ........................... | 345/173 |
| 7,136,047 B2 * | 11/2006 | Shimada et al. | ........................... | 345/168 |
| 7,190,351 B1 * | 3/2007 | Goren | ........................... | 345/173 |
| 2009/0199092 A1 * | 8/2009 | Ghassabian | ........................... | 715/261 |
| 2010/0020033 A1 * | 1/2010 | Nwosu | ........................... | 345/173 |

FOREIGN PATENT DOCUMENTS

CN       1731331 A       2/2006

* cited by examiner

*Primary Examiner* — Fred Tzeng
(74) *Attorney, Agent, or Firm* — Altis Law Group, Inc.

(57) ABSTRACT

An electronic device and a method for predicting word input include generating a virtual keyboard comprising a plurality of virtual keys and receiving input letters and searching an English word database according to the input letters. The electronic device and the method further include retrieving the one or more possible words that begin with the input letters, confirming one or more virtual keys corresponding to the retrieved one or more possible words, and displaying the confirmed one or more virtual keys different from other virtual keys.

18 Claims, 3 Drawing Sheets

ELECTRONIC DEVICE AND METHOD FOR PREDICTING WORD INPUT

BACKGROUND

1. Field of the Invention

Embodiments of the present disclosure are related to word input, and in particular, to an electronic device and method for predicting word input in the electronic device.

2. Description of Related Art

At present, many electronic devices have a predictive character function (e.g., Chinese character) input. When users input a character, the electronic device will provide a plurality of characters which that begin with the input character for people to choose.

However, when inputting a letter of an English word, electronic devices may not provide any obvious prompt on a display to help users. Therefore, it may be time-consuming, and inconvenient for people to input English words.

What is needed, therefore, is an improved electronic device and method for predicting word input in the electronic device.

SUMMARY OF THE INVENTION

According to the present disclosure, an electronic device includes a generating module that generates a virtual keyboard, the virtual keyboard comprising a plurality of virtual keys; an inputting module that displays the virtual keyboard on a touch panel and receives input letters of an English word; a searching module that searches the English word database according to the input letters, and retrieves one or more possible words that begin with the input letters; a confirming module that confirms one or more next possible letters after the input letters as one or more predictive letters and confirms one or more virtual keys corresponding to the one or more predictive letters; and a displaying module that highlights the confirmed one or more virtual keys on the virtual keyboard.

According to the present disclosure, a method is disclosed for predicting word input including steps: generating a virtual keyboard, the virtual keyboard comprising a plurality of virtual keys; displaying the virtual keyboard on a touch panel and receiving input letters of an English word; searching the English word database according to the input letters, and retrieving one or more possible words that begin with the input letters; confirming one or more next possible letters after the input letters as one or more predictive letters and confirming one or more virtual keys corresponding to the one or more predictive letters; and highlighting the confirmed one or more virtual keys on the virtual keyboard.

The present disclosure provides the electronic device and method of predicting word input to enable convenient and high-speed input of English word by confirming one or more next possible letters after the input letters and highlighting one or more virtual keys corresponding to the one or more next possible letters. According to the present disclosure, providing obvious prompt of a next available letter on the display allows users to input English word more easily and conveniently.

The above summary of the present disclosure is not intended to describe every implementation of the present invention. The figures and the detailed description that follow more particularly exemplify these implementations.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
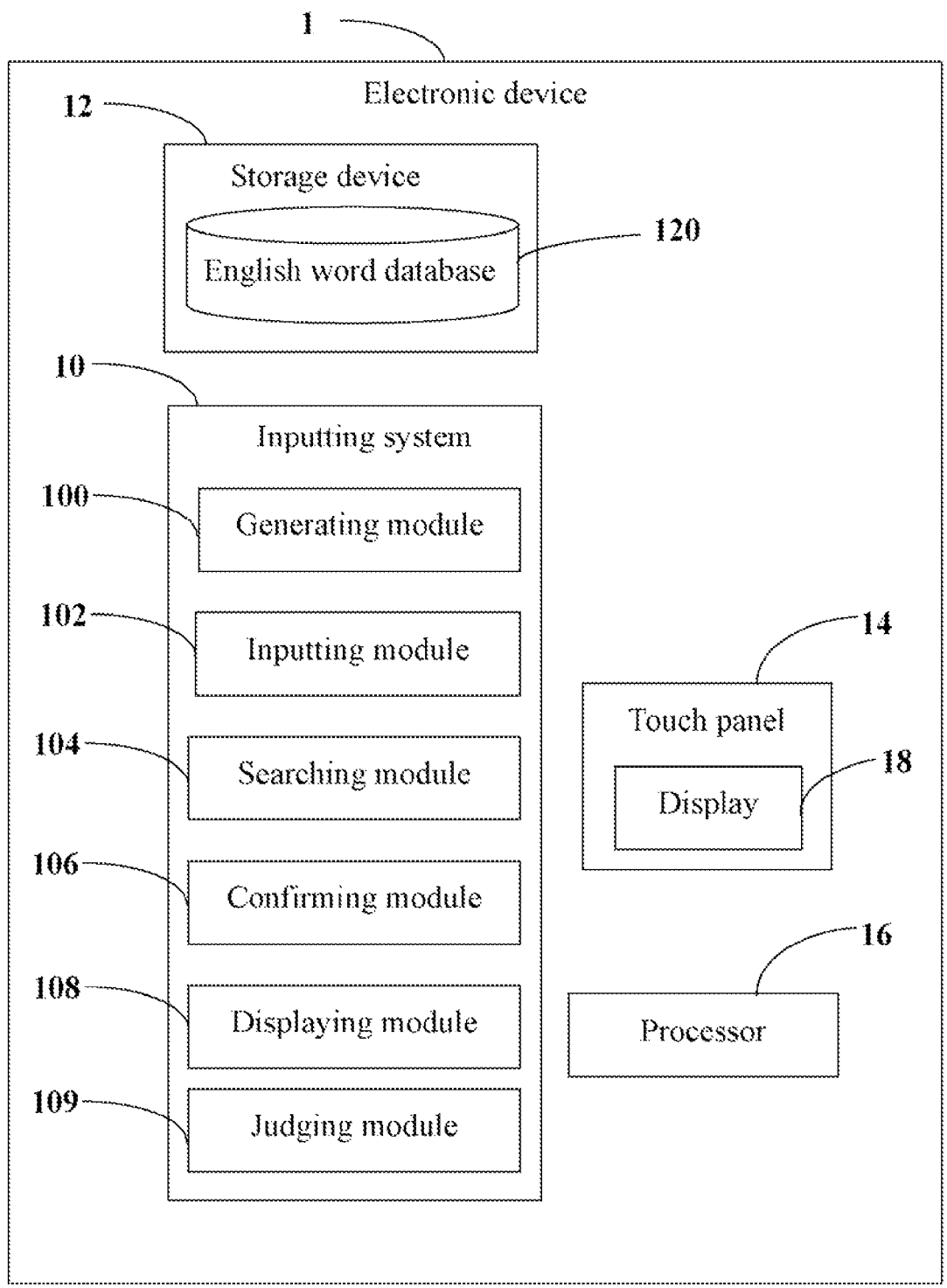
FIG. 1 is a block diagram of one embodiment of an electronic device including an input system.

FIG. 1 is a block diagram of one embodiment of an electronic device 1 including an input system 10. The electronic device 1 includes a storage device 12, a touch panel 14, and a processor 16. The storage device 12 may be a memory of the electronic device 1 and also may be an external storage card, for example, such as a smart media (SM) card, secure digital (SD) card and so on. The storage device 12 may store various kinds of data, such as an English word database 120, for example. The touch panel 14 includes a display 18. The processor 16 executes one or more computerized operations of the electronic device 1 and other applications, to provide the functions of the electronic device 1. Depending on the embodiment, the electronic device 1 may be a mobile phone, a notebook computer, or a personal digital assistant, or any other electronic devices.

In the embodiment of the present disclosure, the input system 10 comprises a generating module 100, an inputting module 102, a searching module 104, a confirming module 106, a displaying module 108, and a judging module 109. The modules 100, 102, 104, 106, 108, and 109 may comprise one or more computerized codes to be executed by the processor 16 to perform one or more operations of the electronic device 1. Details of these operations will be provided below.

Figure 2:
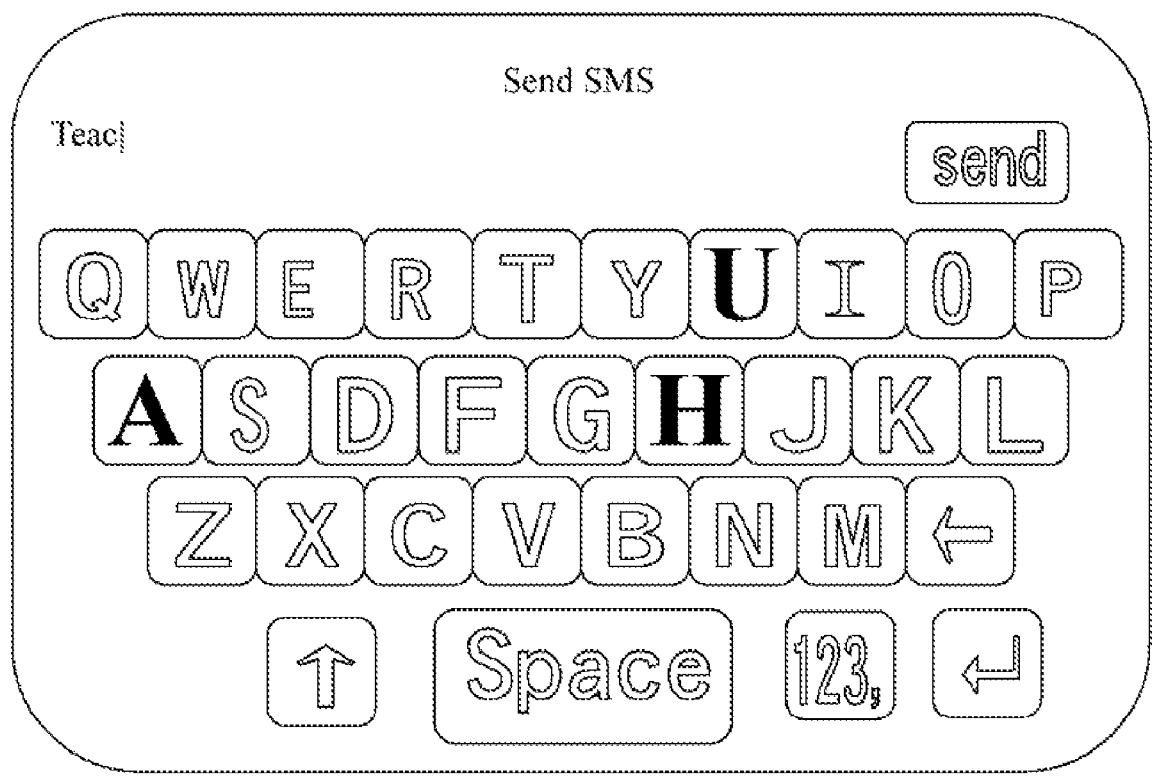
FIG. 2 is a schematic diagram of one embodiment of a virtual keyboard of the electronic device of FIG. 1.

The generating module 100 generates a virtual keyboard on the display 18 of the touch panel 14 including a plurality of virtual keys. In one embodiment, as shown in FIG. 2, a distribution and an arrangement of the virtual keys on the virtual keyboard may be similar to the letters key on a keyboard of a computer. In another embodiment, the distribution and the arrangement of the virtual keys on the virtual keyboard may be configured according to actual requirements or input habits.

The inputting module 102 displays the virtual keyboard on the touch panel 14 when the electronic device 1 is in an editing mode. The inputting module 102 further receives input letters of an English word in response to user input. A user of the electronic device 1 may input one or more letters by clicking the virtual keys on the virtual keyboard, or using a finger or a stylus to write the input letters on the touch panel 14.

The searching module 104 searches the English word database 120 according to the input letters and determines whether the English word database 120 includes one or more possible words that begin with the input letters so as to retrieve the one or more possible words that begin with the input letters.

If a word or one or more letters have been mistakenly entered, the searching module 104 may display a message prompt on the display 18 to the user to prompt that an error may have been made, or the English word database 120 does not include any possible word that begins with the input letters. In one embodiment, the message prompt may be "Unable to search any corresponding word" on the display 18. Then, the user may choose to continue to input more letters, or modify the input letters.

If the searching module 104 retrieves the one or more possible words that begin with the input letters from the English word database 120, then the confirming module 106 confirms one or more next possible letters after the input letters as one or more predictive letters. The confirming module 106 further confirms one or more virtual keys corresponding to the one or more predictive letters. A detailed example is provided below.

The displaying module 108 displays the confirmed one or more virtual keys that are different from the other virtual keys on the virtual keyboard. In one example, the confirmed one or more virtual keys may be highlighted. Thus, the user may easily find the one or more virtual keys corresponding to the one or more predictive letters, and select a target input letter from the one or more virtual keys. In one embodiment, the displaying module 108 may display the confirmed one or more virtual keys as being different from the other virtual keys by enhancing brightness of the confirmed virtual keys, embossing the confirmed virtual keys, and/or displaying the confirmed virtual keys with different colors.

For example, referring to FIG. 2, each virtual key on the virtual keyboard merely displays one letter. If the input letters are "Teac," the searching module 104 searches the English word database 120 and retrieves words that begin with "Teac", such as teacake, teach, teacher, and teacup, for example. The confirming module 106 confirms the predictive letters after the input letter "Teac" as "a," "h," and "u," and then confirms the virtual keys "a," "h," "u" corresponding to the predictive letters. The displaying module 108 displays the confirmed virtual keys "a," "h," "u" with a determined color in order to highlight the confirmed virtual keys.

The judging module 109 determines whether the English word has been finished inputted. In one embodiment, the judging module 109 may confirm that the English word currently inputted has been finished inputted if a punctuation is input, a space bar is pressed, and/or the electronic device 1 exits the editing mode. Otherwise, if no punctuation is input, the space bar is not pressed, or the electronic device 1 is in the editing mode, the judging module 109 determines that the English word has not been finished inputted.

Figure 3:
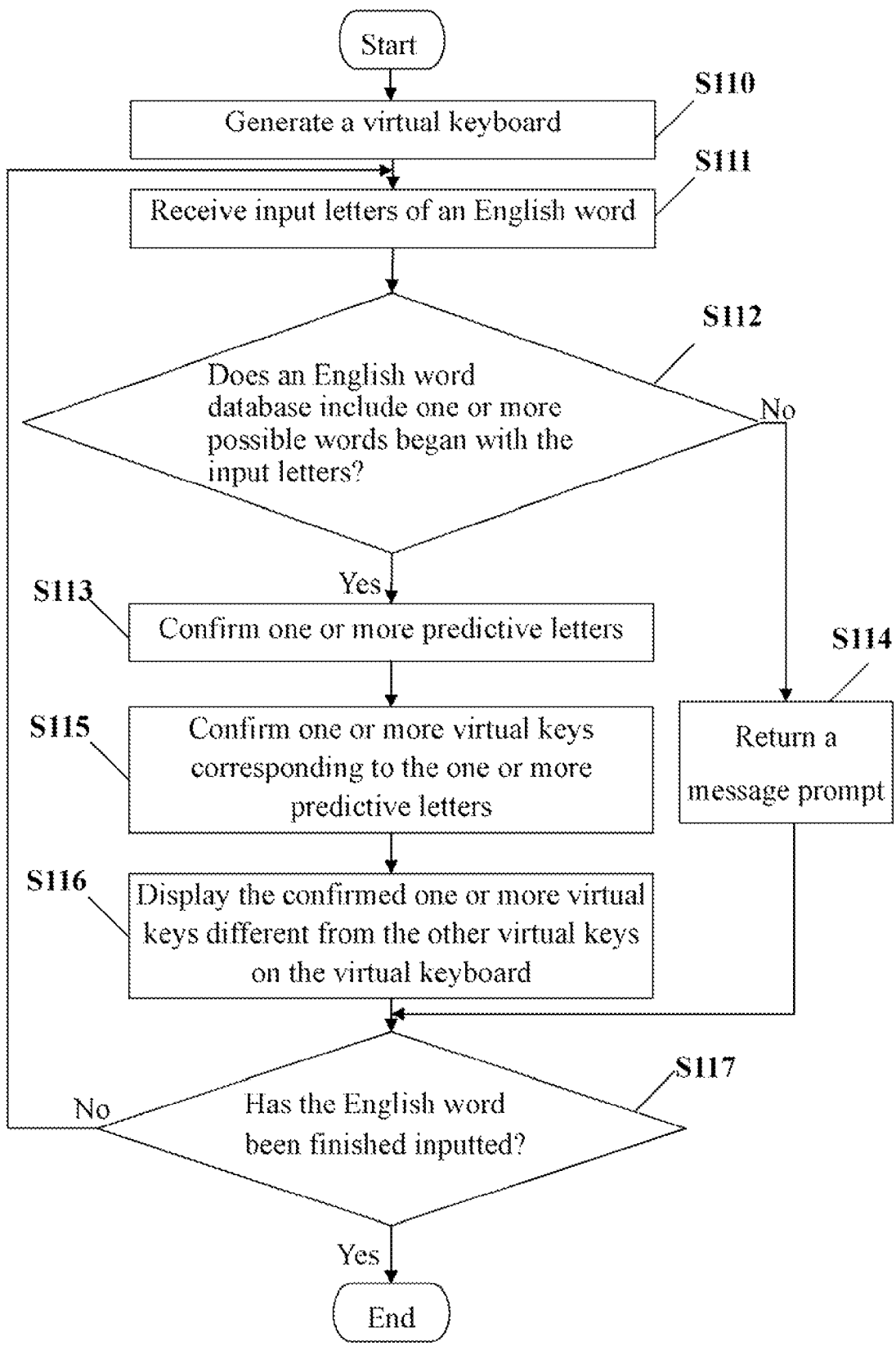
FIG. 3 is a flowchart of one embodiment of a method for predicting word input in the electronic device of FIG. 1.

FIG. 3 is a flowchart of one embodiment of a method for predicting word input in the electronic device of FIG. 1. Depending on the embodiment, additional blocks may be added, others removed, and the ordering of the blocks may be changed.

In block S110, the generating module 100 generates a virtual keyboard on the display 18 of the touch panel 14 including a plurality of virtual keys.

In block S111, when the electronic device 1 is in an editing mode, the inputting module 102 displays the generated virtual keyboard on the touch panel 14 and receives input letters of an English word.

In block S112, the searching module 104 searches the English word database 120 according to the input letters, and determines whether the English word database 120 includes one or more possible words that begin with the input letters so as to retrieve the one or more possible words that begin with the input letters.

If the searching module 104 retrieves the one or more possible words that begin with the input letters from the English word database 120, in block S113, the confirming module 106 confirms one or more next possible letters after the input letters as one or more predictive letters, and block S115 is implemented.

If the searching module 104 does not retrieve any possible word that begins with the input letters from the English word database 120, in block S114, the searching module 104 returns a message prompt on the display 18 to the user to prompt that a mistake word is input or the English word database 120 does not include any possible word that begins with the input letters. As mentioned above, the message prompt may be "Unable to search any corresponding word" on the display 18. Then, the user may choose to continue to input, or modify the input letters. Then the procedure turns to block S117.

In block S115, the confirming module 106 confirms one or more virtual keys corresponding to the one or more predictive letters.

In block S116, the displaying module 108 displays the confirmed one or more virtual keys that are different from the other virtual keys on the virtual keyboard so as to highlight the confirmed one or more virtual keys. Thus, the user may easily find the one or more virtual keys corresponding to the one or more predictive letters, and select a target input letter from the one or more virtual keys.

In block S117, the judging module 109 determines whether the English word has been finished inputted. As mentioned above, if a punctuation is input, a space bar is pressed, and/or the electronic device 1 exits the editing mode, the judging module 109 determines that the English word has been finished inputted. Otherwise, if no punctuation is input, the space bar is not pressed, or the electronic device 1 is in the editing mode, the judging module 109 determines that the English word has not been finished inputted, then the procedure returns to block S111, the inputting module 102 continues to receive input letters of an English word.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be comprised herein within the scope of this disclosure and the above-described inventive embodiments, and the present disclosure is protected by the following claims.

What is claimed is:

1. An electronic device, comprising:
   a storage device operable to store an English word database;
   a touch panel;
   at least one processor; and
   one or more programs stored in the storage device and being executable by the at least one processor, the one or more programs comprising:
   a generating module that generates a virtual keyboard on a display of the touch panel, the virtual keyboard comprising a plurality of virtual keys;
   an inputting module that displays the virtual keyboard on the touch panel when the electronic device is in an editing mode, and receives input letters of an English word;

a searching module that searches the English word database according to the input letters, and retrieves one or more possible words that begin with the input letters if the English word database comprises the one or more possible words;

a confirming module that confirms one or more next possible letters after the input letters as one or more predictive letters according to the one or more possible words, and confirms one or more virtual keys corresponding to the one or more predictive letters; and a displaying module that highlights the confirmed one or more virtual keys on the virtual keyboard.

2. The electronic device as claimed in claim 1, wherein the one or more programs further comprise a judging module that determines whether the English word has been finished inputted.

3. The electronic device as claimed in claim 2, wherein the judging module determines whether the English word has been finished inputted by determining if a punctuation on the virtual keyboard is input, a space bar on the virtual keyboard is pressed, or the editing mode is exited.

4. The electronic device as claimed in claim 1, wherein the searching module further returns a message prompt on the display for prompting that the English word database does not comprise possible word that begins with the input letters.

5. The electronic device as claimed in claim 1, wherein the displaying module highlights the confirmed one or more virtual keys on the virtual keyboard by enhancing brightness of the confirmed one or more virtual keys, embossing the confirmed one or more virtual keys, and/or displaying the confirmed one or more virtual keys and other virtual keys with different colors on the virtual keyboard.

6. The electronic device as claimed in claim 1, wherein the electronic device is a mobile phone, a notebook computer, or a personal digital assistant.

7. A computer-implemented method for predicting word input used in an electronic device, the electronic device comprising a storage device, the storage device storing an English word database, the method comprising:

generating a virtual keyboard on a display of a touch panel, the virtual keyboard comprising a plurality of virtual keys;

displaying the virtual keyboard on the touch panel of the electronic device when the electronic device is in an editing mode;

receiving input letters of an English word;

searching the English word database according to the input letters, and retrieving one or more possible words that begin with the input letters if the English word database comprises the one or more possible words;

confirming one or more next possible letters after the input letters as one or more predictive letters according to the one or more possible words, and confirming one or more virtual keys corresponding to the one or more predictive letters; and highlighting the confirmed one or more virtual keys on the virtual keyboard.

8. The method as claimed in claim 7, wherein the method further comprises:

returning a message prompt on the display for prompting that the English word database does not comprise any possible word that begins with the input letters.

9. The method as claimed in claim 7, wherein the method further comprises:

determining whether the English word has been finished inputted;

if the English word has been finished inputted, ending this procedure;

if the English word has not been finished inputted, then returning to the step of receiving input letters of an English word.

10. The method as claimed in claim 9, wherein the English word has been finished inputted is determined by if a punctuation on the virtual keyboard is input, a space bar on the virtual keyboard is pressed, or the editing mode is exited.

11. The method as claimed in claim 7, wherein the confirmed one or more virtual keys on the virtual keyboard is highlighted by enhancing brightness of the confirmed one or more virtual keys, embossing the confirmed one or more virtual keys, and/or displaying the confirmed one or more virtual keys and other virtual keys with different colors on the virtual keyboard.

12. The method as claimed in claim 7, wherein the electronic device is a mobile phone, a notebook computer, or a personal digital assistant.

13. A non-transitory computer readable storage medium storing a set of instructions, the set of instructions capable of being executed by a processor to perform a method for predicting word input used in an electronic device, the electronic device comprising a storage device, the storage device storing an English word database, the method comprising:

generating a virtual keyboard on a display of a touch panel, the virtual keyboard comprising a plurality of virtual keys;

displaying the virtual keyboard on the touch panel of the electronic device when the electronic device is in an editing mode;

receiving input letters of an English word;

searching the English word database according to the input letters, and retrieving one or more possible words that begin with the input letters if the English word database comprises the one or more possible words;

confirming one or more next possible letters after the input letters as one or more predictive letters according to the one or more possible words, and confirming one or more virtual keys corresponding to the one or more predictive letters; and highlighting the confirmed one or more virtual keys on the virtual keyboard.

14. The non-transitory computer readable storage medium as claimed in claim 13, wherein the method further comprises:

returning a message prompt on the display for prompting that the English word database does not comprise any possible word that begins with the input letters.

15. The non-transitory computer readable storage medium as claimed in claim 13, wherein the method further comprises:

determining whether the English word has been finished inputted;

if the English word has been finished inputted, ending this procedure;

if the English word has not been finished inputted, then returning to the step of receiving input letters of an English word.

16. The non-transitory computer readable storage medium as claimed in claim 15, wherein the English word has been finished inputted is determined by if a punctuation on the virtual keyboard is input, a space bar on the virtual keyboard is pressed, or the editing mode is exited.

17. The non-transitory computer readable storage medium as claimed in claim 13, wherein the confirmed one or more virtual keys on the virtual keyboard is highlighted by enhancing brightness of the confirmed one or more virtual keys, embossing the confirmed one or more virtual keys, and/or displaying the confirmed one or more virtual keys and other virtual keys with different colors on the virtual keyboard.

18. The non-transitory computer readable storage medium as claimed in claim 13, wherein the electronic device is a mobile phone, a notebook computer, or a personal digital assistant.

* * * * *